United States Patent Office 3,506,635
Patented Apr. 14, 1970

3,506,635
POLY (ω - PERFLUOROALKANOIC - SUBSTITUTED TRIFLUOROETHYLENE) AND THE PROCESS FOR THEIR PREPARATION
Burton C. Anderson, Wilmington, Del., assignor to E. I. du Pont de Nemours and Company, Wilmington, Del., a corporation of Delaware
No Drawing. Continuation-in-part of application Ser. No. 455,980, May 14, 1965. This application Apr. 26, 1967, Ser. No. 633,684
Int. Cl. C08f 5/00
U.S. Cl. 260—88.3     1 Claim

ABSTRACT OF THE DISCLOSURE

Poly(ω-perfluoroalkanoil-substituted trifluoroethylenes) are claimed. The acyl fluoride polymers having an infrared absorption at 5.35μ are produced by pyrolysis at temperatures of 200–275° C. of fluoroepoxy polymers obtained by the vinyl polymerization of ω-epoxyperfluoro-1-alkenes at pressures of about 65 kilobars and temperatures of about 200° C. The high molecular weight acyl polymers can be fabricated into solid objects and films. The polymers containing carboxyl groups are useful as adhesives, ion-exchange resins, and cation permeable membranes. The low molecular weight polymers are useful as mold release agents and as waterproofing agents.

CROSS-REFERENCE TO RELATED APPLICATION

This invention is a continuation-in-part of my co-assigned application Ser. No. 455,980, filed May 14, 1965 now U.S. Patent 3,366,610.

BACKGROUND OF THE INVENTION

Field of the invention

This invention relates to novel perfluoroalkane polymers, and to the process for their preparation.

Description of the prior art

Perfluoroalkyl polymers having pendant carboxyl groups are produced from α,β-unsaturated perfluoroalkenoic acids such as perfluoroacrylic and perfluorocrotonic acid (Rendall and Pearlson, U.S. 2,730,543). These prior art polymers have secondary carboxyl groups, i.e., carboxyl groups bonded directly to the polymer chain on a carbon atom which is bonded to two other carbon atoms. The polymers of this invention have primary carboxyl groups, i.e., carboxyl groups bonded to a carbon bonded only to one other carbon atom which is not in the polymer backbone. For this reason, the polymers of the invention are much more stable towards decarboxylation. This greater stability is a valuable property since it enables the use of conventional high temperature molding and fabricating techniques for the manufacture of molded objects, films, and adhesives produced from the polymers of this invention.

The monomer, ω-carboxyperfluoro-1-alkene, is known although a polymer from this monomer has not been reported. Also its salts, $CF_2=CF(CF_2)_nCOOM$ where $n$ is 2–18 are disclosed (Haszeldine, U.S. 2,833,831).

The present process provides an indirect method of preparing polymers of the above nonconjugated-ω-carboxyperfluoro-1-alkenes. This method consists of the addition polymerization of ω-epoxyperfluoro - 1 - alkene followed by pyrolysis.

SUMMARY OF THE INVENTION

This invention is directed to linear polymeric compositions of the formula

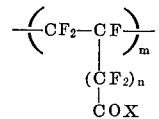

(I)

wherein $m$ is an integer of 5–5000 or higher and $n$ is an integer in the range 1–18 and X is fluorine, chlorine, bromine, hydroxyl or lower alkoxy. The carboxylic acid polymers have an infrared absorption at about 5.6μ and the acyl fluoride polymers possess an infrared absorption at 5.35μ.

The polymers of this invention having acyl fluoride groups are produced by pyrolysis at a temperature of 200–275° C. of the corresponding fluoroepoxy polymers with the loss of the diradical difluoromethylene (:CF₂), as shown by the equation

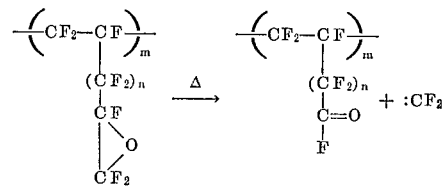

The polymers having carboxyl or carboxylic ester groups are produced from the acyl fluoride polymers by hydrolysis or alcoholysis of the acyl fluoride group; and the polymers having acyl chloride and acyl bromide groups are produced by halogenation of carboxylic acid polymers with a halogenation agent, such as PCl₃, PBr₃ and the like.

The high molecular weight polymers of this invention are useful for the production of films and molded objects. The high molecular weight polymers having carboxyl groups are also useful as adhesives for the bonding of metals such as aluminum. The low molecular weight polymers are useful as waterproofing agents and mold release agents.

DESCRIPTION OF THE PREFERRED EMBODIMENTS

The polymers of this invention are produced by pyrolysis of corresponding fluoroepoxy polymers. For purposes of nomenclature the polymers can be considered as vinyl polymers, i.e., addition polymers, of appropriate monomeric vinyl compounds of one of the following acyl fluoride vinyl monomers:

perfluorobut-3-enoyl fluoride,
perfluoropent-4-enoyl fluoride,
perfluorohex-5-enoyl fluoride,
perfluorohept-6-enoyl fluoride,
perfluorooct-7-enoyl fluoride,
perfluoronon-8-enoyl fluoride,
perfluorodec-9-enoyl fluoride,
perfluoroundec-10-enoyl fluoride,
perfluorododec-11-enoyl fluoride,
perfluorotridec-12-enoyl fluoride,
perfluorotetradec-13-enoyl fluoride,
perfluoropentadec-14-enoyl fluoride,
perfluorohexadec-15-enoyl fluoride, perfluoroheptadec-16-enoyl fluoride,
perfluorooctadec-17-enoyl fluoride,
perfluoroeicos-19-enoyl fluoride and the like.

The corresponding polymers can be named poly(perfluorobut-3-enoyl fluoride), polyperfluoropent-4 - enoyl fluoride), poly(fluorooctadec-17-enoyl fluoride) and so on.

Included within the polymers of this invention are the polymers of Formula I wherein X is a fluoride, chloride, bromide, hydroxyl, or lower alkoxy groups. For example, the polymers include:

poly(perfluorobut-3-enoyl bromide),
poly(perfluorobut-3-enoic acid),
poly(methyl perfluorobut-3-enoate),
poly(perfluorooct-7-enoyl chloride),
poly(perfluorooct-7-enoyl bromide),
poly(perfluorooct-7-enoic acid,
poly(ethyl perfluorooct-7-enoate),
poly(perfluorooctadec-17-enoyl chloride),
poly(perfluorooctadec-17-enoic acid),
poly(ethyl perfluorooctadec-17-enoate) and the like.

The polymers containing chloro and bromo groups are produced from the carboxyl polymer by an acyl halide synthesis reaction with typical halogenating agents such as $PCl_3$, $PBr_3$, $SOCl_2$ and the like.

The polymers range in physical form from viscous liquids which are easily soluble in most inert organic solvents to hard solids which can gel in organic solvents. The polymers in which X is fluorine, chlorine, or bromine are sensitive to water and to acidic or basic hydrolytic reagents. With moisture or an acidic hydrolytic reagent, the fluorine, chlorine, or bromine group is replaced by OH forming the carboxyl-containing polymers of this invention. These carboxyl-containing polymers are acidic substances which react with aqueous alkali metal and alkaline-earth metal hydroxides, ammonia, and amines to form the corresponding salt.

Acyl-containing polymers can be reacted with alkanols to form the esters of this invention. Acyl-containing polymers can also be reacted with ammonia primary amines or secondary amines to form the corresponding amides.

Polymers containing carboxyl groups, that is polymers where the acyl halide group has been hydrolyzed, can be prepared by exposure of the corresponding poly acyl halide to moist air or by the reaction of the acyl halides with acidic hydrolytic reagents such as aqueous mineral acids, hydrochloric and sulfuric acid, aqueous mixtures of ethanol and mineral acids and the like. The hydrolysis can be conducted at temperatures of 25–100° C. with 50–100° being the preferred reaction temperature range.

Polymers containing lower alkoxycarbonyl groups, i.e., where X is lower alkoxy, are produced by the reaction of lower alkanols with poly(perfluoroalkenoyl fluorides). Alkanols which can be used include methanol, ethanol, n-propanol, isopropanol, n - butanol, 2 - butanol, n-pentanol, n-hexanol, n-octanol, and the like.

The polymers in which X is halide, and preferably fluoride, being carboxylic acid halides, are sensitive to moisture as moist air or water as well as to acidic or basic hydrolytic agents. With moisture or an acidic hydrolytic agent the halogen is replaced by hydroxyl, i.e., the acyl halide group is converted to a carboxyl group. With a basic hydrolytic agent, especially in an excess basic hydrolytic agent such as aqueous alkali metal hydroxides, alkaline-earth metal hydroxides and ammonium hydroxide, the acyl halide group is converted to a carboxylic acid salt. The polymers in which X is hydroxyl, of course, are stable toward hydrolysis and have the capacity to form salts when treated with basic hydrolytic reagents or to form acid chlorides or bromides with halogenating agents, e.g., $PCl_3$, $PBr_3$, $POCl_3$, $SOCl_2$ and the like.

Polymers containing different X groups can be prepared. For example, the partial hydrolysis of a polyacyl fluoride gives a polymer containing a mixture of acyl fluoride and carboxyl groups. The reaction of the polyacyl fluoride with a limited amount of a lower alkanol, i.e., an insufficient amount of the lower alkanol than that required to react with all the acyl fluoride groups present, results in a polymer containing a mixture of acyl fluoride and lower alkoxycarbonyl groups.

The polymers range in physical form from viscous liquid materials which are easily soluble in ordinary organic solvents to hard solid products which can gel in solvents when the value of $m$ is ca. 1000 or larger. The low molecular weight polymers generally are soluble in nonaqueous and nonreactive solvents, e.g., hydrocarbons, halohydrocarbons, ethers, esters, nitriles, and the like. Hydroxylic solvents, e.g., alcohols or acids, however, can react with the polymers having acyl halide groups; and basic solvents, e.g., amines, can form salts with either the acyl fluoride- or carboxyl containing polymers.

The higher molecular weight polymers are generally thermally stable and are obtained as solid resins which are plastic and film-forming. Molded articles can be made from the solid products by conventional methods of compression molding at a high temperature and pressure, and films can be cast from solutions in the nonreactive solvents described above and including ether, hexafluoroisopropanol hydrate and the like.

These polymers in addition to the pendant ω-perfluoroalkanoic acid groups and their derivatives, can have end groups resulting from disproportionation such as

(II)

and end groups formed by an abstraction process such as

(III)

where Y is hydrogen, fluorine, chlorine, bromine, etc. These end groups are not critical to the invention since they are not at the heart of the invention.

The polymers of the invention having acyl fluoride pendant groups (X is fluorine) are produced by pyrolysis of the corresponding perfluoroepoxy polymers with the loss of a difluoromethylene fragment. These perfluoroepoxy polymers are obtained by the vinyl polymerization of ω-epoxyperfluoro-1-alkenes. The polymers having the carboxyl group function (X is hydroxyl) are prepared from the acyl fluoride polymers by hydrolysis. These processes can be represented as follows:

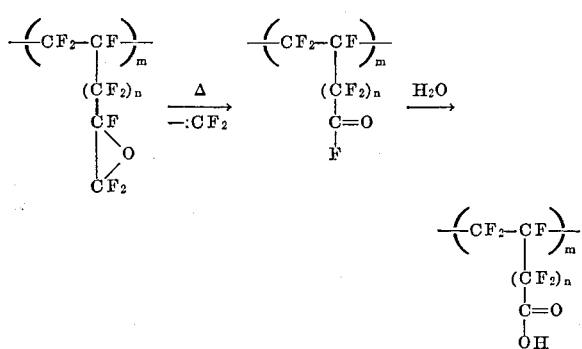

Pyrolysis of vinyl-type polymers of ω-epoxyperfluoro-1-alkenes takes place at temperature in the range 200–275° C. The reaction is demonstrated by thermal gravimetric analysis, which shows significant incremental weight loss corresponding to loss of a difluoromethylene fragment as formation of the acyl fluoride function proceeds. The pyrolysis is accompanied by a loss in infrared absorption at about 6.45μ (assigned to the trifluoroepoxy ring group) and a concomitant gain in infrared absorption at about 5.35μ (assigned to the carbonyl fluoride group). Differential thermal analysis shows the reaction to be strongly exothermic, with a thermal crest at about 245° C.

The pyrolysis process can be carried out at ordinary pressure, or at subatmospheric or superatmospheric pressures if desired by heating the perfluoroepoxy polymer at 200–275° C. The pyrolysis can be conducted in either glass or metallic reactors. Alternatively the pyrolysis can be conducted concurrently with the polymerization of the ω-epoxyperfluoro-1-alkene precursors at temperatures of 225–275° C. and preferably at 235–250° C. The time required for essentially complete conversion of the fluoroepoxy polymer to acyl fluoride polymer depends upon the temperature employed, ranging from a few minutes at temperatures of about 240–275° C. to several hours at temperatures of about 200–240° C. The solid pyrolyzed polymer is usually obtained in the form of a solid mass or billet, which can be subdivided mechanically if desired. Preferably the pyrolysis is conducted at 225–250° C.

The acyl halide polymers are stable indefinitely when stored in an atmosphere free of moisture. In the presence of atmospheric moisture the acyl polymers are slowly hydrolyzed to the corresponding carboxylic acid polymer. The hydrolysis of the acyl fluoride can be followed spectrographically by the disappearance of the infrared absorption band at 5.35μ and the increase of the initially small infrared absorption at 5.6μ.

The fluoroepoxy polymer starting materials used in the above pyrolysis reaction of this invention are prepared by the vinyl polymerization of ethylenically unsaturated perfluoroepoxy monomers of the formula

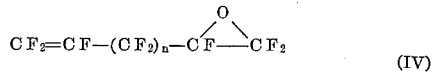

(IV)

where $n$ is as defined above.

The ethylenically unsaturated fluoroepoxy compounds are prepared by the epoxidation of a 1,2-dichloro-ω-ethylenically unsaturated perfluorocarbon followed by dehalogenation.

The 1,2-dichloro-ω-ethylenically unsaturated perfluorocarbon can be prepared by the decarboxylation at temperatures of about 150° C. of the sodium salt of an ω-chlorodifluoro-(ω–1)-chlorofluoroperfluoro saturated normal aliphatic monocarboxylic acid having 5–22 carbon atoms. Alternatively, 1,2-dichloro - ω - ethylenically unsaturated perfluorocarbons can be produced by the telomerizataion reaction between 1,2-dichloro-1-iodoperfluoroethane and tetrafluoroethylene. The telomerization reaction is carried out in sealed tubes at autogenous pressures ata elevated temperatures, preferably 110–125° C. The telomer product is a dichloroperfluoroalkene hydroiodic derivative which can be dehydrohalogenated, i.e., hydroiodic acid can be eliminated, using aqueous caustic, to yield the desired 1,2-dichloro-ω-ethylenically unsaturated perfluorocarbon containing 5–22 carbons.

The epoxidation of a 1,2-dichloro-ω-ethylenically unsaturated perfluorocarbon can be conducted with an inorganic peroxide such as hydrogen peroxide in an alkaline medium at −50 to +50° C.

The dehalogenation of the above epoxide can be achieved by a stoichiometric amount of zinc using an ether such as diethyl ether or dioxane as the reaction medium. The dehalogenation can be conducted at temperatures of 50 to 125° C.

The polymerization of the ethylenically unsaturated fluorinated epoxy precursors can be conducted at pressures of about 25–65 kilobars (kb.) at temperatures of 150–200° C. in about 4–6 hours.

The high pressures necessary for this polymerization are achieved by using a tetrahedral anvil pressure device described by E. C. Lloyd, et al., Journal of Res., Nat. Bureau of Standards, 63C, 59 (1959). In this device, the ethylenically unsturated perfluoroepoxy monomer is placed in a platinum ampoule which fits in a graphite sleeve that serves as a resistance heater. This assembly is enclosed in a pyrophyllite tetrahedron and placed in the anvil device. Pressures in excess of 65 kb. are possible in a tetrahedral anvil device, which has been demonstrated to produce pressures in excess of 90 kg.

Other devices for developing extreme pressures can also be used, such as a cascade machine providing two stages of pressure, with the lower pressure primary stage serving to support the smaller, higher presure vessel. Two stage devices were employed by P. W. Bridgman [Phys. Rev., 57, 342 (A40) and Proc. Am. Acad. Arts Sci., 74, 425 (1942)], and more recently have been described by F. R. Boyd in "Modern Very High Pressure Techniques," Wentorf, Editor, Butterworth and Co., Ltd., London, 1962, p. 154.

The preparation of the ethylenically unsaturated compounds, the intermediate fluoroepoxy monomers and the fluoroepoxy polymers is further described in my coassigned patent application Ser. No. 455,980 filed May 14, 1965 now U.S. Patent 3,366,610.

The following examples further illustrate the invention.

EXAMPLE 1

Poly(4,5-epoxyperfluoro-1-ene)

In a platinum ampoule, 0.146 inch in diameter and 9/16 inch long, was sealed 0.0694 g. of 4,5-epoxyperfluoropent-1-ene. The ampoule was packed in the reaction space of 1-inch tetrahedral anvil apparatus and subjected to 65 kb. pressure at a temperature of 200° C. for 4 hr. When it was removed from the anvil apparatus, the platinum ampoule contained 0.0673 g. of a clear, plastic polymer recovered from the ampoule as a solid molding. Differential thermal analysis of the sample showed it to have a melting point of 120° C.

EXAMPLE 2

Poly(perfluorobut-3-enoyl fluoride)

4,5-epoxyperfluoro-1-pentene was homopolymerized in a platinum ampoule at 150° C. for 6 hours under 65 kb. pressure (according to the procedure of Example 1) in a tetrahedral anvil device. The solid product showed strong infrared absorption at 6.45μ indicating presence of the trifluorooxirane ring (fluoroepoxy group). A very small infrared absorption band at 5.35μ indicated the presence of a small proportion of carboxylic acid fluoride groups.

Differential thermal analysis of the fluoroepoxy polymer showed no significant thermal change below about 200° C. Initiation of a strongly exothermic reaction was indicated at about 200° C., and the reaction showed an exothermic crest at 244° C. Separate thermal gravimetric analysis showed incremental weight loss in the temperature range 200–275° C. The pyrolysis product, the vinyl polymer, poly(perfluorobut-3-enoyl fluoride), showed no infrared absorption at 6.45μ and strong absorption at 5.35μ.

When the product was allowed to stand in air, new infrared absorption appeared at 5.6μ accompanied by corresponding reduction in absorption at 5.35μ. The appearance of the infrared absorption at 5.6μ indicated that the acid fluoride pyrolysis product was converted into the vinyl polymer, poly(perfluorobut-3-enoic acid).

EXAMPLE 3

Poly(perfluorobut-3-enoyl fluoride 4,5-epoxyperfluoro-1-pentene was homopolymerized in a platinum ampoule at 175° C. for 6 hours under 65 kb. pressure in a tetrahedral anvil device. The homopolymer, poly(4,5-epoxyperfluoro-1-pentene), was obtained as a solid plug of transparent, hard, strong material. Its infrared absorption spectrum was essentially the same as that of the product of Example 2. The pyrolysis of the intermediate polymers was conducted in a differential thermal analysis apparatus at 200–275° C. The pyrolysis product was essentially the same as the product of Example 2.

EXAMPLE 4

Poly(perfluorobut-3-enoyl fluoride 4,5-epoxyperfluoro-1-pentene (0.3859 g.) was homopolymerized in a platinum ampoule at 200° C. for 6 hours under 65 kb. pressure using a tetrahedral anvil device. The solid product obtained, after it was subjected to reduced pressure to remove any volatile material, was a solid product weighing 0.2726 g. The product showed substantial infrared absorption at 6.45μ and 5.35μ indicating the presence of acyl fluoride and fluoroepoxy groups.

EXAMPLE 5

Poly(perfluorobut-3-enoyl fluoride 4,5-epoxyperfluoro-1-pentene (0.3370 g.) was heated in a platinum ampoule at 250° C. for 6 hours under 25 kb. pressure in a tetrahedral anvil device. The product was a semi-solid which became completely solid (0.20 g.) after it was held under vacuum to remove volatiles. The product showed no infrared absorption at 6.45μ and significant absorption at both 5.30 and 5.60μ. The material was soluble in ether and could be cast into a somewhat brittle film. The film of polymer, after casting, showed strong absorption at 5.6μ.

EXAMPLE 6

Poly(perfluoropent-4-enoyl fluoride 5,6-epoxyperfluoro-1-hexene (0.080 g.) was heated in a platinum ampoule at 300° C. for 4 hours under 65 kb. pressure in a tetrahedral anvil device. The solid product was clear and somewhat brittle. It showed no infrared absorption at 6.45μ and significant absorption at 5.6 and 5.7μ.

The linear polymers of this invention embrace those corresponding to the formula

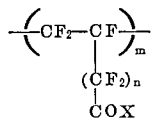

wherein X is fluorine, chlorine, bromine, hydroxyl or alkoxy, n is 1–18. and m is in the range 5–1000. Representative precursor ω-epoxyperfluoro-1-alkene monomers are as follows:

4,5-epoxyperfluoro-1-pentene,
5,6-epoxyperfluoro-1-hexene,
6,7-epoxyperfluoro-1-heptene,
7,8-epoxyperfluoro-1-octene,
9,10-epoxyperfluoro-1-decene,
11,12-epoxyperfluoro-1-dodecene, and
13,14-epoxyperfluoro-1-tetradecene.

The polymers of this invention have a range of repeating units of m=5–5000. The molecular weight preferably is high, i.e., m is equal to about 1000 or higher. The high molecular weight polymers can be molded into films and molded objects. The high molecular weight polymers containing carboxyl groups are useful as adhesives for metals such as aluminum. These high molecular weight polymers can also be used as ion-exchange resins and as cation permeable membranes.

The low molecular weight polymers of this invention are greases and waxy solids which are useful as lubricants, mold release agents, and waterproofing agents especially for papers, cotton and other cellulosic materials.

The embodiments of the invention in which an exclusive property or privilege is claimed are defined as follows:

1. A process for the preparation of a polymer comprising heating at a temperature of 200–275° C. a polymer of the formula

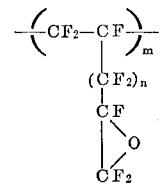

wherein n is an integer from 1 to 18 and m is an integer from 5 to 5000 whereby a linear polymer is produced having the formula

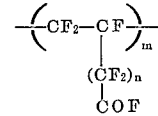

wherein n and m are as defined above.

References Cited

UNITED STATES PATENTS

| | | | |
|---|---|---|---|
| 2,730,543 | 1/1956 | Rendall et al. | 260—465.7 |
| 2,833,831 | 5/1958 | Haszeldine | 260—653.3 |
| 2,862,024 | 11/1958 | Rendall et al. | 260—487 |
| 2,863,906 | 12/1958 | Baranauckas et al. | |
| 3,309,403 | 3/1967 | Mador et al. | 260—544 |
| 3,366,610 | 1/1968 | Anderson | 260—80.3 |

HARRY WONG JR., Primary Examiner

U.S. Cl. X.R.

260—33.2, 33.4, 80, 89.3, 89.5, 89.7, 348, 478, 526, 539, 544, 561